Figure 1:
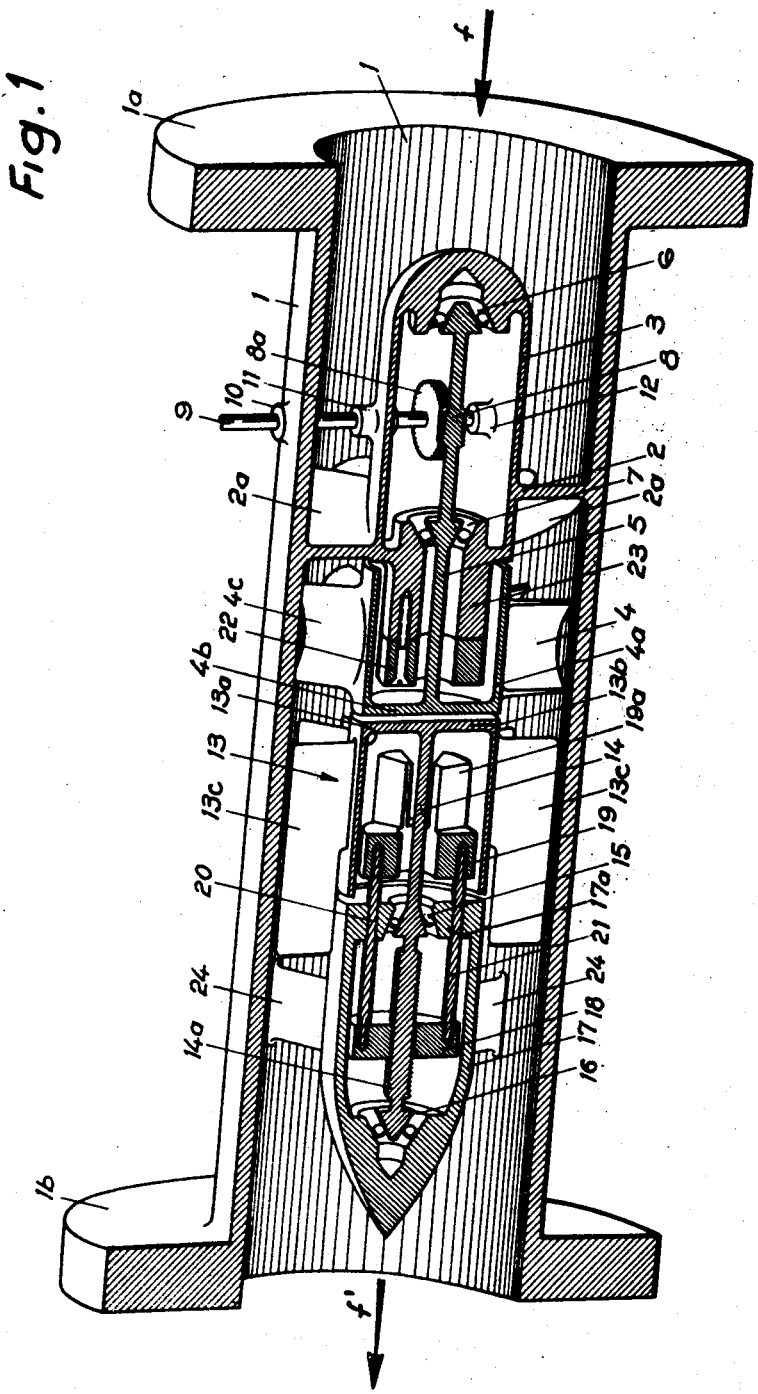

United States Patent Office 3,142,179
Patented July 28, 1964

3,142,179
APPARATUS RESPONSIVE TO FLUID FLOW
Daniel Souriau, Paris, France, assignor to Service National dit: Gaz de France, Paris, France
Filed Mar. 7, 1961, Ser. No. 94,029
Claims priority, application France Mar. 8, 1960
8 Claims. (Cl. 73—231)

This invention relates to fluid flow responsive apparatus and particularly flowmeters and/or integrating flowmeters adapted to provide an indication of the flow rate and/or the total amount of a fluid flowing through a conduit.

One class of flowmeters currently used comprises means, such as a stationary deflector, positioned in the flowpath of the fluid for imparting a rotational velocity component to the fluid at a fixed angle to the axis of flow; and a vaned member or turbine having blades traversed by the fluid so as to be rotated thereby, whereby the rotational velocity of said vaned member or turbine is an approximate measure of the fluid flow. In some types of flowmeters of this class the vanes of the rotatable vaned member are so contoured and disposed that the fluid particles traversing them will not substantially be deflected from the whirling trajectory initially imparted to them by the deflector member. In such cases the energy transferred from the fluid to the rotatable member is substantially zero, and the velocity of said member would constantly and accurately follow the variations in fluid velocity to provide an accurate measure of the fluid flow rate, were it not for the inevitable energy losses due to friction in the shaft bearings, the sensing and indicating apparatus connected thereto, and similar losses. In practice therefore, the angular speed of the rotatable member at all times remains below the theoretical value it would assume in the total absence of energy transfer, so that an absolutely accurate measurement is not obtainable. No adequate compensation for such energy transfer can be effected for all flow velocities, so that the measuring accuracy is greatly limited.

Another type of turbine flowmeter comprises means such as a motor-driven impeller for accelerating the fluid rotationally from a zero initial value to a final value, and a turbine for receiving the energy thus imparted to the fluid to provide a mass flow indication. Such flowmeters are relatively expensive and are power-consuming owing to the necessity of providing a motor drive therein.

It is an object of this invention to provide an improved flowmeter (or similar flow-responsive apparatus) which will be relatively simple, and yet highly accurate, over a wide range of flow velocities.

According to an important aspect of the invention there is provided apparatus responsive to fluid flow, of the type including a turbine interposed in a fluid flowpath for being rotated by the fluid, and output means responsive to rotation of the turbine, which apparatus includes sensing means positioned in the flowpath beyond the turbine for sensing any residual rotational velocity component in the fluid, and retarding means operated by the sensing means for applying a variable retarding couple on the turbine to maintain said residual rotational velocity component substantially at zero.

In another aspect the invention provides flow responsive apparatus which comprises means defining a fluid flowpath, means in said flowpath for imparting a rotational velocity to the fluid, a turbine positioned in said flowpath beyond said last mentioned means and rotated by the fluid whereby the rotational velocity of the fluid is reduced, output means responsive to rotation of the turbine, sensing means in the flowpath beyond the turbine for sensing residual velocity components in the fluid, and retarding means operated by the sensing means for applying a variable retarding couple to the turbine to maintain said residual rotational velocity component substantially at zero.

It will be understood that the turbine member used in the apparatus of the invention essentially differs from the rotatable vaned members sometimes used heretofore in that the turbine member is so constructed as to deflect the fluid from the whirling path initially imparted to it by the deflector member ahead of the turbine, and tend to restore the fluid to a purely axial flow, so that a major proportion of the rotational kinetic energy in the fluid is transferred to the turbine. The energy thus absorbed by the turbine is a maximum when the residual angular velocity of the fluid beyond the turbine is zero. In such conditions the efficiency ratio of the turbine, i.e., the quotient of the energy available on the turbine shaft over the initial rotational energy imparted to the fluid, is a maximum. In these conditions of maximum efficiency, the rotational velocity of the turbine is proportional to the flowrate of the fluid. As a result of the inventive feature of sensing such residual rotational velocity of the fluid beyond the turbine and applying a variable retarding or braking torque to the turbine so as to maintain at all times a residual angular velocity of the fluid of substantially zero magnitude, greatly improved accuracy and performance is obtained without requiring power means for tangentially accelerating the fluid.

Figure 2:
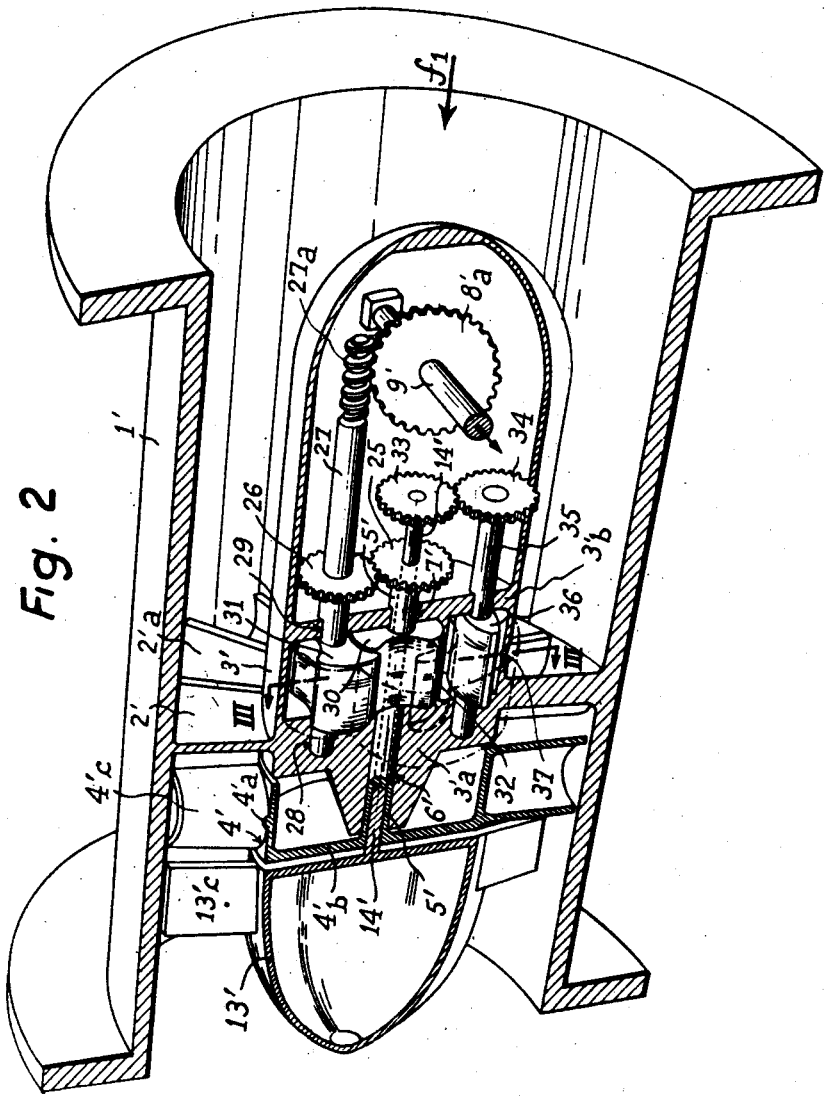
Figure 3:
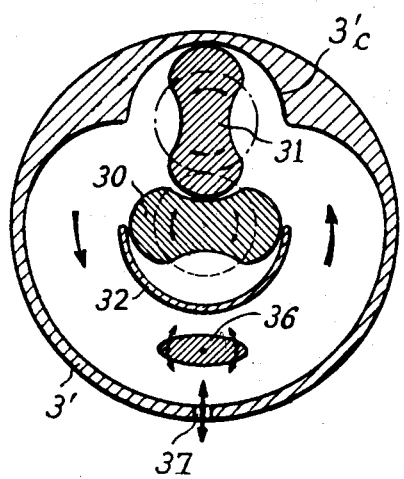
Figure 4:
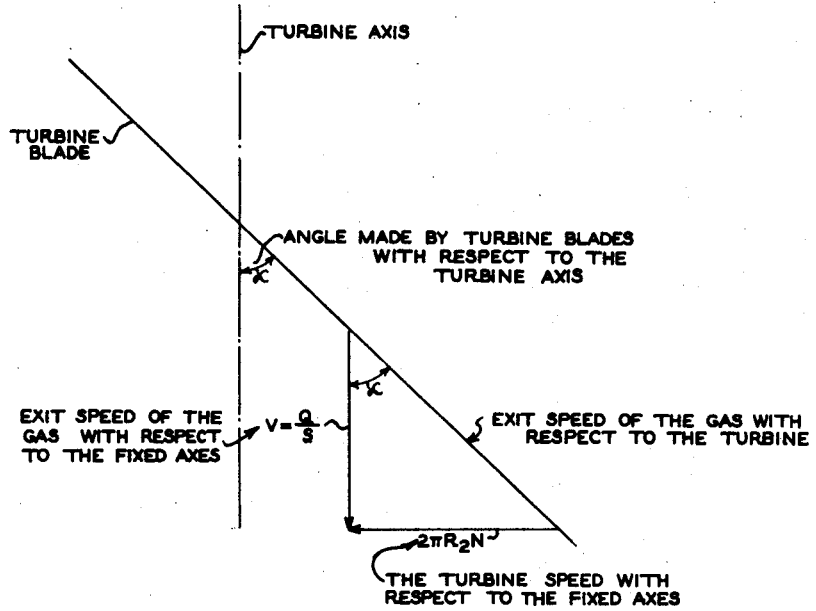
Figure 5A:
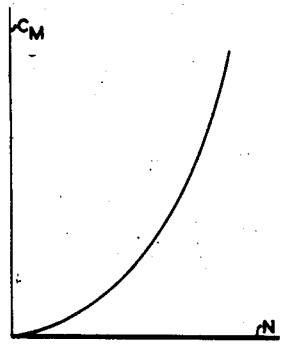
Figure 5B:
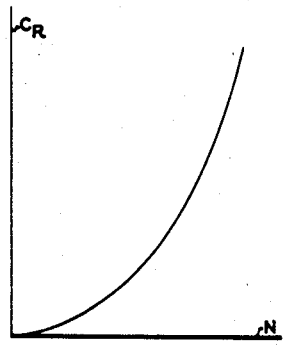

Two exemplary embodiments of the invention will now be described for purposes of illustration but not of limitation with reference to the accompanying diagrammatic drawings, wherein:

FIGURE 1 is a simplified perspective view, in axial section, of a first embodiment;
FIGURE 2 is a similar view of another embodiment;
FIGURE 3 is a cross sectional view on line III—III of FIGURE 2, on an enlarged scale.
FIGURE 4 is a vector diagram employed in describing the theory of operation of the apparatus; and
FIGURES 5A and 5B are curves used in explaining the relationship of pump characteristics and turbine characteristics.

In the embodiment of the invention shown in FIGURE 1, the flowmeter comprises a generally cylindrical, open-ended casing 1 adapted to be connected by way of end flanges 1a and 1b in a conduit traversed by the fluid the flow rate and/or total flow of which is to be measured. The direction of fluid flow through casing 1 is indicated by the arrows $f$ and $f'$.

Positioned in casing 1 near the input end thereof is a stationary deflector or stabilizer unit 2 which comprises a casing 3 mounted coaxially within casing 1 and stationary helicoidal vanes 2a connected at their inner ends with casing 3 and their outer ends with the flowmeter casing 1 and so formed as to impart a rotational velocity component to the fluid about the axis of the casing 1 in a constant angular direction regardless of flow velocity.

Mounted in the casing 1 beyond the deflector is a turbine 4 comprising a hub member consisting of a cylindrical annular flange 4a and a transverse end wall 4b across the rearmost end of said flange secured to one end of shaft 5 which is journalled in spaced bearings 6 and 7; bearing 6 being shown positioned at the upstream end of the deflector casing 3 and bearing 7 being mounted in an axial extension 23 of said deflector casing projecting into turbine hub flange 4a and formed with an axial bore through which shaft 5 extends. The turbine 4 further comprises the turbine blades 4c secured to the turbine hub and extending outwardly towards the sidewall of casing 1 with only a minimum radial clearance between the blade tips and the inner surface of casing 1. The turbine blades 4c are shaped in a manner well known in turbine design so as to absorb a maximum proportion of the kinetic energy of rotation of the fluid stream which energy is a result of the rotational velocity component imparted to said fluid by the deflector 2, and transfer such rotational energy to the turbine. For this purpose, as is well-known in the case of an axial-flow action type turbine (the type herein shown), the slope angle of the turbine blades adjacent the leading edges thereof is preferably such that the fluid will enter the turbine blades substantially without any impact thereagainst for a value of angular velocity of the turbine equal to one half the angular velocity component of the fluid as imparted by the deflector. Moreover, the concave side of each turbine blade is provided with a curvature such as to divert the direction of the whirling fluid back towards the axis of the flowpath, i.e., to tend to cancel the angular velocity component imparted to the fluid by the deflector, such cancellation being complete when the turbine is revolving at an angular speed equal to one half the angular rotation of the fluid. The concave side of each turbine blade is spaced from the convex side of an adjacent blade so as to define substantially uniform flow section areas for the fluid between adjacent blades throughout the entire axial length of the turbine blades.

It will be understood that the angular velocity of the turbine constitutes a measure of the volumetric flow rate of the fluid, and this angular velocity is measured from the angular velocity of the turbine shaft 5, through means which in the embodiment being described comprises a worm 8 formed on shaft 5 and worm gear 8a supported on a shaft 9 extending out of the casing 1 and journalled in the bearings 10, 11 and 12 respectively in the wall of casing 1 and the walls of deflector casing 3. The outer end of shaft 9 may be connected to operate any desired indicator mechanism, such as an integrating counter or the like for indicating the total amount of fluid that has traversed the apparatus over any period of time. However, the measurement would only be absolutely accurate if all of the rotational energy of the whirling fluid were transferred to the turbine 4. In practice this is not the case since a non-negligible fraction of the fluid energy is inevitably dissipated as heat in the form of friction in the bearings of shafts 5 and 9, in the gearing 8, 8a and the indicating mechanism, and similar losses of a mechanical and/or electrical character. The amounts of energy thus dissipated by friction and the like are not constant but vary with the speeds of fluid flow and turbine rotation, thereby preventing their being adequately taken into account in calibrating the indicating instrument, and necessarily detracting from the accuracy of measurement.

In accordance with the invention, the effects of these energy losses throughout the system are minimized and the measuring accuracy very greatly enhanced by applying to the turbine a controlled retarding torque so as at all times to regulate the speed of the turbine to the precise value required to cause the residual rotational velocity of the fluid at the outlet from turbine 4 to be reduced to zero, in which condition the turbine is operating with optimum efficiency. In this condition substantially all the energy of the fluid will be absorbed by the turbine blades. For this purpose means are provided beyond the turbine for sensing any residual angular velocity of the fluid, and retarding or braking means controlled by said sensing means act to apply a braking couple on the turbine until such residual velocity has been reduced to zero.

In the embodiment shown in FIGURE 1 the residual velocity-sensing means comprises a rotatable vaned member 13 having a hub member consisting of an annular cylindrical flange 13a aligned with the flange 4a of the turbine casing and a transverse end wall 13b across the foremost end of said flange and secured to one end of a shaft 14 which is journalled in spaced bearings 15 and 16 positioned in a stationary casing 17 having a faired outer contour and mounted in the apparatus casing 1 by means of the spider arms 24. Extending from the outer periphery of flange 13a are flat radial vanes 13c. The interior of the stationary faired casing 17 is recessed and contains a nut member 18 screwed upon a threaded portion 14a of shaft 14. Rotation of nut 18 is prevented by two or more shanks 20, 21 projecting from a side of the nut parallel to the shaft 14 and slidably extending through openings provided therefor in a cross-wall 17a of casing 17. Secured to the outer ends of the rods 20, 21 forwardly of cross-wall 17a is a magnetic structure comprising an annulus 19 freely surrounding shaft 14 and carrying a pair of permanent-magnet extensions or masses 19a projecting therefrom towards the turbine 4. The end flange 4b of the sensor turbine structure 4 is made from an electrically-conductive, non-magnetic material, and the previously mentioned extension hub 23 has secured thereto, a magnetic armature member 22.

With this arrangement it will be evident that a magnetic circuit is provided between pole masses 19a and armature 22 across the turbine end wall 4b and will induce eddy currents within the non-magnetic end-wall 4b, so as to apply a retarding torque to the turbine. The amount of eddy currents thus created and consequent retarding torque applied clearly depend on the axial position of the magnetic masses 19a, increasing as the masses are projected closer to the turbine.

In operation therefore, any residual rotational velocity component present in the fluid stream as it issues from the turbine blading 4c acts to impart rotation to the sensor vanes 13c and hence to shaft 14. This rotation of shaft 14 is converted into an axial displacement of the nut member 18 threadedly engaging the shaft, and a corresponding displacement of the magnetic members 19a obtained. The pitch direction of screw thread 14a and nut 18 is so selected with respect to the sense of rotation of the turbine 4, that when the vanes 4c detect a residual velocity in the fluid in the same sense as the initial angular velocity imparted thereto by deflector vanes 2a, the magnetic members 19a are projected closer to the turbine to increase the retarding force applied thereto, until the vaned member 13 is finally brought to a standstill indicating that the residual angular velocity of the fluid has been cancelled. At this time the turbine is operating under optimum efficiency conditions and, in the illustrated embodiment wherein the turbine is shown to be of the axial-flow action type, the speed of the turbine is equal to one half the angular velocity of rotation of the fluid entering the turbine from the deflector 2, and is an accurate measure of the fluid flowrate.

The operation of the apparatus is based on the following theory: Under maximum conditions of efficiency, the tangential speed of the "gas" at the turbine outlet with respect to the fixed axes will equal zero: $V_{t2}=0$. The turbine speed with respect to the fixed axes equals $2\pi R_2 N$ ($R_2$ being the mean radius of the turbine at the outlet, and N the number of revolutions of the turbine per time unit).

At the turbine outlet, the surface area of passage is S, and the volume delivery is Q, consequently, the dicharge speed of the "gas" with respect to the fixed axes is:

$$V = \frac{Q}{S}$$

The speed of the gas at the outlet, with respect to the turbine, is parallel to the turbine blades, i.e., it forms an angle $\alpha$ with the turbine axis, where the angle $\alpha$ is the angle formed by the turbine blade with respect to the turbine axis. The composite speed indicating a relation between the outlet speed of the gas with respect to the turbine, and the outlet speed of the gas with respect to fixed axes and the turbine speed with respect to fixed axes, is represented in FIG. 4. It can be expressed by a vectorial relation: the oulet speed of gas with respect to the fixed axes equals the outlet speed of gas with respect to the turbine plus the turbine speed with respect to the fixed axes.

Therefore, in the triangle of vector addition for the resultant speed as shown in FIG. 4: $V \, \text{tg} \, \alpha = 2\pi R_2 N$ (V being the outlet speed of gas with respect to fixed axes, $\alpha$ the angle formed by the blade and the turbine axis, and $2\pi R_2 N$ the turbine speed with respect to fixed axes).

Assuming now that speed V at the gas outlet with respect to the fixed axes equals $Q/S$, as was set forth above, it follows that $$\frac{Q}{S} \operatorname{tg} \alpha = 2\pi R_2 N, \text{ or } Q = \frac{S 2\pi R_2}{\operatorname{tg} \alpha} N$$

(wherein Q represents the volumetric delivery, S the surface area of passage, $R_2$ the mean radius of the turbine at the outlet, $\alpha$ the angle of the blade with the turbine axis, and N the number of revolutions of the turbine per time unit).

In the above equation, factor $$\frac{S 2\pi R_2}{\operatorname{tg} \alpha}$$

is a design factor of the apparatus and is, therefore, a constant, and, consequently, N, which represents the number of revolutions of the turbine per time unit is proportional to the volume of output Q. Hence, under optimum-efficiency conditions for the equipment, the rotational speed of the turbine is proportional to the volumetric output of the fluid passing through the equipment.

In the modified embodiment illustrated in FIGURES 2 and 3, the flowmeter again comprises a cylindrical casing 1' with flanged, open ends; a stationary stabilizer or deflector structure 2' having stationary helical vanes 2'a connected between the outer casing 1' and inner faired casing 3'; a turbine 4' comprising a cylindrical annular flange 4'a, an end wall 4'b and turbine blades 4'c secured on a shaft 5' journalled in the spaced bearings 6', 7'; and a shaft 9' geared to turbine shaft 5' as presently described and extending out of the apparatus casing 1' for connection with indicating means (not shown) such as an integrating counter. As in the first embodiment moreover, there is provided a vaned sensor member 13' for detecting any residual rotational velocity of the fluid issuing from turbine blading 4'c, said vaned member comprising the flat radial vanes 13'c extending from a faired hub secured on a shaft 14' which extends co-axially through the turbine shaft 5', which is hollow in this embodiment.

The means for applying a retarding torque to the turbine, instead of being magnetic in character as in the first embodiment described, in this case include a gear pump of the generally known type including a pair of intermeshing pump elements of epi-hypo-cycloidal configuration 30 and 31 shown in cross section in FIGURE 3, and positioned in a pump chamber defined in the fair-shaped inner casing 3' between two spaced bulkheads 3'a and 3'b thereof. Pump element 30 is secured on turbine shaft 5' while pump element 31 is secured on a shaft 27 parallel and spaced from shaft 5' and journalled in bearings 28, 29 in bulkheads 3'a, 3'b. Shafts 5' and 27 carry meshing gears 25, 26 outside the pump chamber having equal pitch diameters for providing a 1/1 gear ratio.

Shaft 27 is formed at its rear end with a worm 27a meshing with worm gear 8'a of shaft 9' for the aforementioned velocity measuring function.

Fluid from the main flowpath in casing 1 is admitted into the pump chamber through an orifice 37 (also see FIGURE 3) formed in the wall of casing 3' to be recycled continuously around the pump chamber by the action of the pump elements 30, 31. A controllable resistance is inserted in the circular flowpath of the fluid thus recycled around the pump chamber, in the form of a pivoted throttle valve 36 secured on a shaft 35 parallel to the other shafts of the system and journalled in the walls of the pump chamber. Shaft 35 carries a gear 34 outside the pump chamber which meshes with a gear 33 carried on the free end of shaft 14' of the residual velocity-sensing member.

It is to be noted that the gear pump comprising elements 30 and 31 need not for the purposes of this invention be constructed with close sealing tolerances as would usually be required with pumps of this or similar types, since any clearances provided between the revolving and stationary components of the pump would simply combine with the minimum clearance defined by throttle valve 36 in its fully closed position (normal to that shown in FIGURE 3) to determine the maximum retarding torque applicable to the pump and turbine. As shown, casing 3' is formed with a part-cylindrical recess 3'c the inner surface of which defines the trajectory of the lands of pump element 31, and a symmetrical part-cylindrical through-like deflector member 32 is mounted within the casing 3' to define the trajectory of the lands of pump element 30.

In the operation of this embodiment, the fluid entering the flowmeter casing as indicated by arrow $f1$, is again deflected by the deflector vanes 2'a which impart thereto a rotational velocity component in a fixed angular direction with respect to the flow axis regardless of the axial flow velocity of the fluid, as in the first embodiment. The fluid then impinges on the turbine blades 4'c and rotates the turbine so as to transfer a large proportion of its rotational kinetic energy thereto. The energy is transferred to the turbine in maximum efficiency conditions when the fluid issues out of the turbine with a zero residual angular velocity, i.e., in purely axial flow conditions. The energy transferred to the turbine 4 serves to overcome mechanical friction of the shaft bearings and gearings, to drive the counter or other indicating instrument, and finally to operate the gear pump. Should the residual angular velocity component of the fluid beyond turbine 4 be other than zero, the residual velocity of the fluid acts to rotate the vaned sensor unit 13, and the shaft 14 of the latter acting through gearing 33–34 to rotate the throttle valve 36 in a direction such as to induce an additional flow resistance into the path of the recycled fluid in the pump chamber. This serves to retard the turbine 4' until the discharged fluid therefrom has a purely axial velocity, at which time the sensor unit 13 is no longer caused to rotate. At such time the speed of rotation of turbine 4, as sensed by the shaft 9', is an accurate measure of the fluid flow.

The second embodiment just described has an advantage over the first embodiment in that it substantially increases the range of turbine speeds within which the desired optimum-efficiency conditions for the turbine can be obtained. That is, considering the characteristic curve represented by the equation $C_M = f(N)$, FIG. 5A, indicating the variations of the motor torque of the turbine 4 as a function of angular turbine velocity N, and the characteristic curve represented by equation $C_R = f(N)$, FIG. 5B, indicating the variations of the resistant couple $C_R$ developed by the pump as a function of said angular velocity, it is possible to so proportion the pump in regard to the turbine used that both said curves are practically identical or are of very similar shape over a wide range at any position of the detector member at which the optimum-efficiency condition of the turbine is obtained. For the curves of FIGS. 5A and 5B this occurs when $K_M = K_R$. In these conditions, the vaned sensor member will only be rotated momentarily during accelerations and decelerations of the fluid flow, but will remain stationary in steady-state conditions. This greatly increases the range of minimum and maximum velocity values between which the maximum efficiency condition of the turbine can be effectively obtained.

The type of gear pump described is especially advantageous in that it can easily develop a high output pressure and hence the flow rate through the pump and the pump dimensions can be made comparatively small for a given maximum retarding torque; however, other types of pumps may be used as the retarding means in this embodiment of the invention.

In order to reduce the torque load on the vaned detector member 13, the throttle valve 36 is preferably provided with a conventional compensated contour.

It will be understood that various modifications may be made in the constructional features of the two embodiments disclosed for illustrative purposes herein, without exceeding the scope of the invention. Thus, the means for picking off the velocity measurement from the turbine shaft, rather than comprising a shaft and mechanical gearing as shown, may be provided in the form of a magnetic coupling or electro-magnetic pick-off device as well-known to provide either a mechanical velocity signal or an electrical velocity signal for application to the indicating means, e.g., counter.

What I claim is:

1. Fluid flow-responsive apparatus comprising means defining a fluid flowpath, means in said flowpath for imparting a rotational velocity to the fluid, a turbine positioned in said flowpath beyond said last means and rotated by said fluid whereby the rotational velocity thereof is reduced, output means responsive to rotation of said turbine, sensor means in the flowpath beyond said turbine and sensing any residual velocity component of the fluid, and retarding means operated by said sensor means and coupled to the turbine for applying a variable retarding couple thereto so as to maintain said residual rotational velocity component substantially at zero magnitude.

2. Fluid flow responsive apparatus comprising means defining a fluid flowpath, stationary deflector means in said flowpath for imparting a rotational velocity component to the fluid, a turbine positioned beyond the deflector for rotation by said fluid, output means operated by said turbine, a rotatable vaned member positioned beyond the turbine to be rotated by the having residual rotational velocity in the fluid beyond said turbine, means for applying a variable retarding torque to the turbine, and means operated by the vaned member and coupled with said torque applying means to vary the retarding torque applied thereby so as to maintain said vaned member substantially stationary.

3. The apparatus claimed in claim 1, wherein said retarding means comprise means creating a magnetic retarding field.

4. The apparatus claimed in claim 1, wherein said retarding means comprises means creating a staitonary magnetic field and including at least one magnetic member adjustably positionable to vary the strength of said field, means rotatable with the turbine and positioned within said field to have eddy currents induced therein and to be retarded thereby, and means connected with said sensor means and said positionable magnetic member to vary the strength of the field for varying the retarding force applied to said rotatable means.

5. The apparatus claimed in claim 1, wherein said retarding means comprises means defining a substantially closed fluid circuit, a pump positioned to displace fluid around said circuit, drive means driving said pump from said turbine, a displaceable member associated with said circuit for introducing a variable flow resistance to the fluid therein, and means operatively connecting said sensor means with said member for displacing the displaceable member to vary the flow resistance in the pumping circuit and the retarding force applied to said turbine.

6. The apparatus claimed in claim 1 wherein, said retarding means comprises means defining a substantially closed pump chamber positioned radially inward of said flowpath and communicating with said flowpath, a gear pump positioned in said chamber to displace fluid around said chamber, means driving said gear pump from the turbine, a throttle valve positioned in said chamber and a drive connection from said sensor means to said valve for varying the flow resistance opposed to said pump and the retarding force applied to the turbine.

7. The apparatus of claim 1 wherein said retarding means comprises a pump for delivering a retarding fluid through a controllable throttling orifice, said pump having a resistang torque/speed characteristic substantially similar in shape to the torque/speed characteristic of said turbine when the latter operates under optimum-efficiency conditions, and control means for controlling said throttle orifice responsive to said sensor means so that the residual rotational velocity is constantly maintained at zero magnitude.

8. The apparatus claimed in claim 2, wherein said retarding means comprises means defining a substantially closed pump chamber positioned radially inward of said flowpath and communicating with said flowpath through an orifice, a gear pump positioned in said chamber to displace fluid therearound in a closed circuit, a drive connection from the turbine to the gear pump, a throttle valve positioned in said chamber, and a drive connection from said vaned member to said throttle for varying the flow resistance opposed to said pump and the retarding force applied to the turbine.

References Cited in the file of this patent

UNITED STATES PATENTS

| 1,467,565 | Blair | Sept. 11, 1923 |
| 2,857,761 | Bodge | Oct. 28, 1958 |
| 2,914,943 | Ballard | Dec. 1, 1959 |

FOREIGN PATENTS

| 1,107,040 | France | Dec. 27, 1955 |
| 828,093 | Great Britain | Feb. 17, 1960 |

OTHER REFERENCES

Pages 11–13, Introduction to Gas Turbine and Jet Propulsion Design, by Norman and Zimmerman, published 1948, by Harper.